Sept. 28, 1937. W. C. WEBER Re. 20,522

TUBE DRAWING

Original Filed Dec. 18, 1930 3 Sheets-Sheet 1

INVENTOR
WALTER C. WEBER.
BY Dorey & Cole
ATTORNEY

Sept. 28, 1937. W. C. WEBER Re. 20,522

TUBE DRAWING

Original Filed Dec. 18, 1930 3 Sheets-Sheet 2

INVENTOR
WALTER C. WEBER.
BY Dorsey & Cole
ATTORNEY

Sept. 28, 1937. W. C. WEBER Re. 20,522

TUBE DRAWING

Original Filed Dec. 18, 1930 3 Sheets-Sheet 3

INVENTOR
WALTER C. WEBER.
BY
Sorey & Cole
ATTORNEY

Reissued Sept. 28, 1937

Re. 20,522

UNITED STATES PATENT OFFICE 20,522

TUBE DRAWING

Walter C. Weber, Corning, N. Y., assignor, by mesne assignments, to Corning Glass Works, Corning, N. Y., a corporation of New York Original No. 1,892,477, dated December 27, 1932, Serial No. 503,293, December 18, 1930. Application for reissue November 30, 1934, Serial No. 755,500

22 Claims. (Cl. 49—17.1)

This invention relates to glass drawing, and more particularly to the manufacture of glass tubing by flowing the molten glass over the crest of an annular curb projecting upwardly from the bottom of a container of molten glass, the interior of the curb forming a glass flowing orifice, at such head that the flowing glass does not fill the orifice but issues therefrom in a hollow stream. Inside the stream so formed means are provided for chilling the inner surface of the stream by radiation from a cooling element while, if desired, means may be provided for re-heating the exterior of the stream after it moves from off the curb to fire-finish it. The head of glass at the crest of the curb is preferably controlled by means of a vertically adjustable sleeve dipping into the surface of the glass concentric with the curb. By the use of such a sleeve cold air may also be drawn down between the interior of the stream and the cooling element to accentuate the cooling effects.

A specific embodiment of my invention is set out in the following disclosure and shown in the accompanying drawings, in which.

Figure 1:
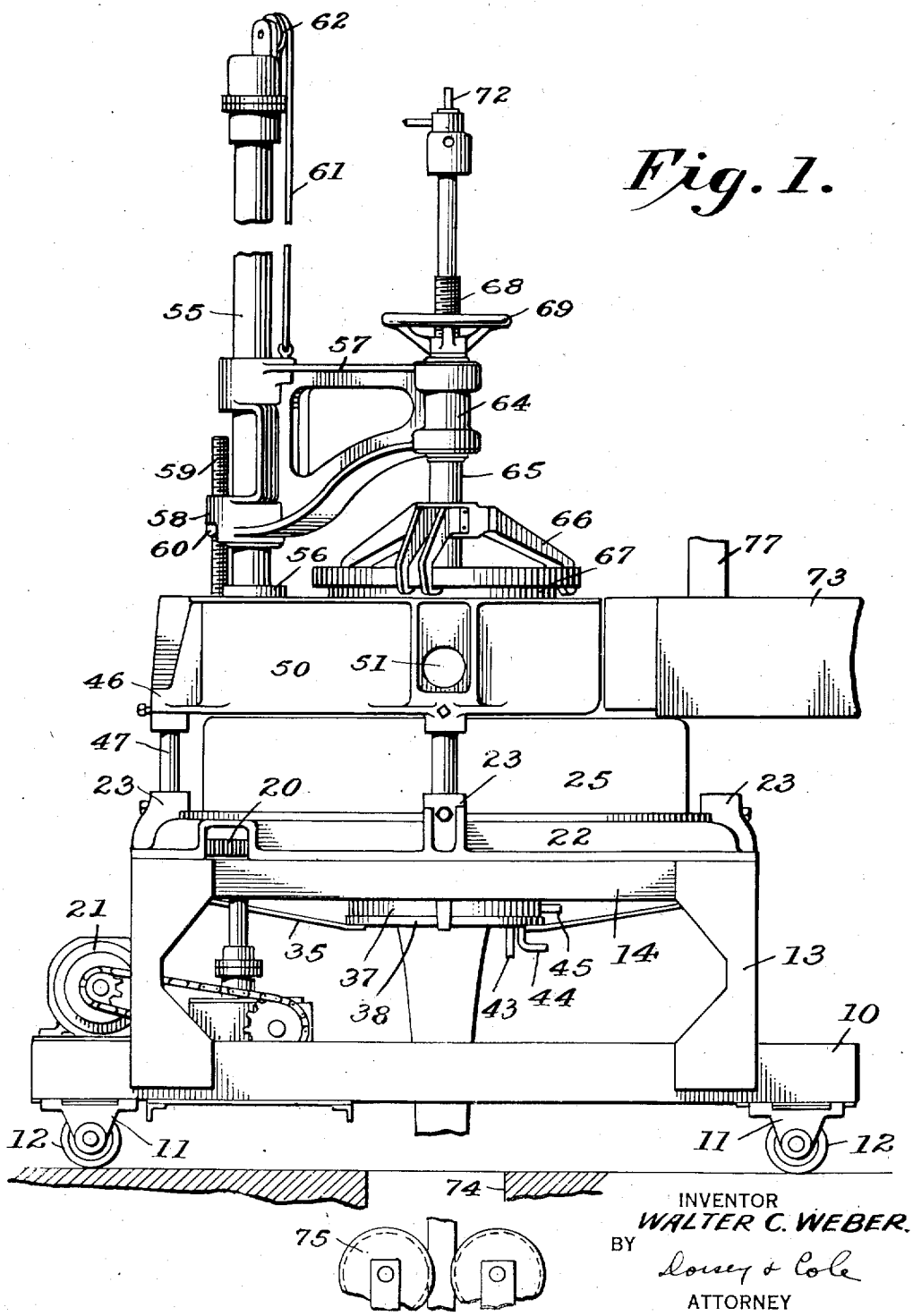
Fig. 1 is a side elevation of my apparatus.
Figure 3:
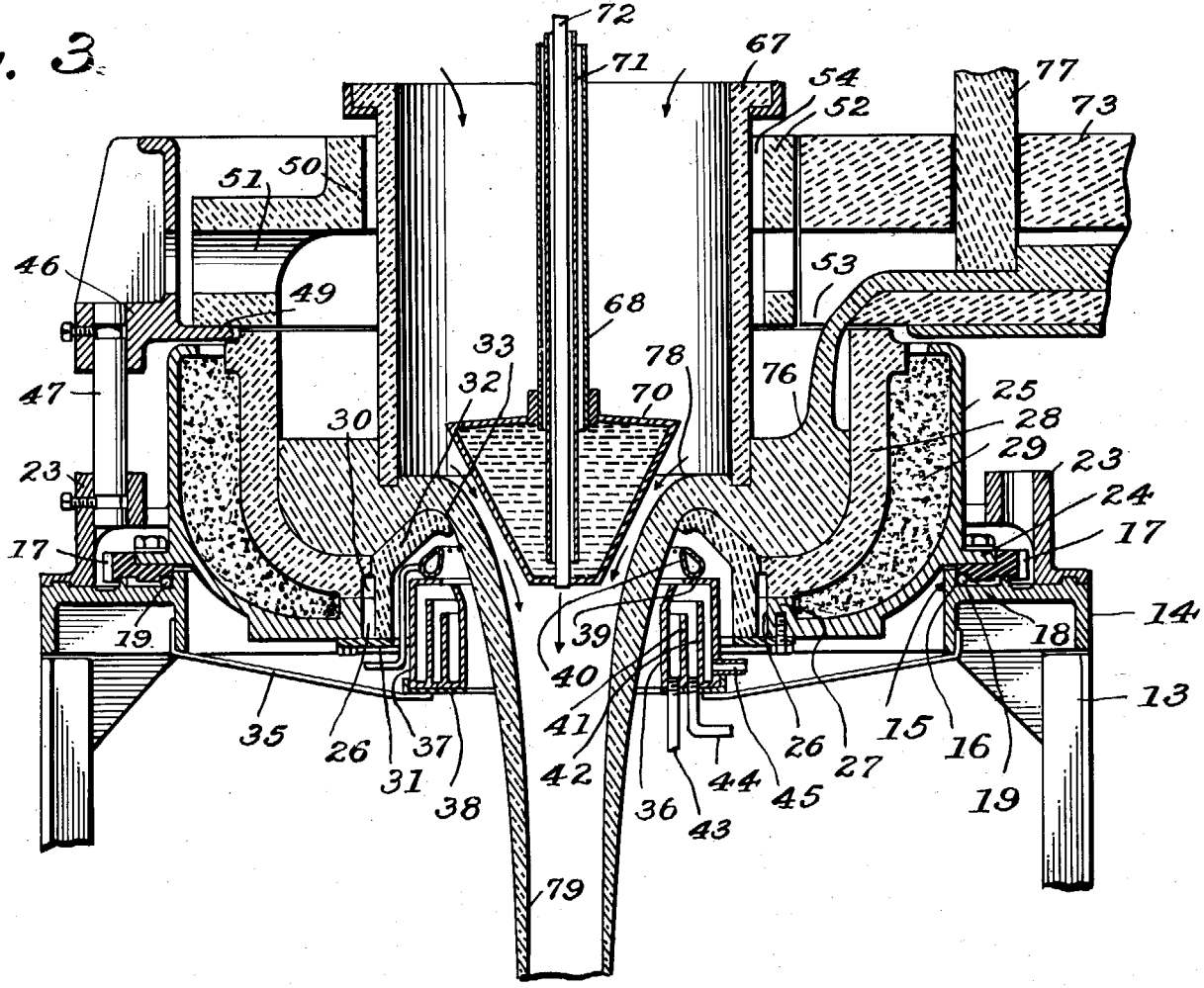
Fig. 3 is a sectional view taken along the line 3—3 of Fig. 2.

Referring to the drawings in detail, a base 10, rectangular in form and constructed preferably of channel girders is supported on depending journal members 11 in which wheels 12 are axled, the wheels providing movability for the apparatus. Secured to the base are four angle irons 13 supporting a channeled casting 14, which is formed with a large circular opening in its center surrounded by a flange 15 (Fig. 3). This casting is provided on its upper surface adjacent the flange 15 with a ball race 16. A gear 17 fits rotatably around the flange 15 and is provided with a ball race 18 which coacts with the ball race 16 and balls 19 to form an anti-friction bearing. A pinion 20 (Fig. 1) which is driven by any suitable power source, shown here as an electric motor 21 is journaled on the casting 14 to engage gear 17. A housing 22 is positioned on the casting 14 to enclose the gear 17, and sockets 23 are made integral with the housing for a purpose which will be hereinafter explained.

Supported by lugs 24 (Fig. 3) on the gear 17 and rotatable therewith is a casing 25 whose bottom is formed with a circular aperture 26 surrounded by an upstanding flange 27. A refractory bowl 28 rests on the upper edge of the flange 27 and is separated from the sides of the casing by insulating material 29, and formed in its bottom is an aperture 30 which registers with the aperture 26 in the casing. A ring 31 is bolted to the bottom of the casing 25 so that it underlaps the edge of the aperture 26 and supports a refractory cone 32 which extends upwardly into the interior of the bowl and snugly fits aperture 30. The upper end of the cone is formed with an inwardly extending annulus to form a circular glass discharge orifice 33.

Secured to the under side of the casting 14 are depending brackets 35 which support at their lower ends a fire-polishing and cooling unit positioned on the inside of the cone, concentric with the orifice 33. This unit consists of inner and outer cylinders 36 and 37 arranged in spaced concentric relation, the lower ends of these cylinders being connected by a base 38. The upper end of the inner cylinder 36 is flared outwardly while the upper end of the outer cylinder 37 is turned inwardly at 39. Supported on the inturned portion 39 of the upper end of the outer cylinder is a ring-shaped burner 40 the orifices of which are designed to project a flame against the glass at the point where it emerges from the orifice 33 of the cone 32. Arranged in spaced concentric relation between the inner and outer cylinders 36 and 37 are cylinders 41 and 42, the inner cylinder 41 being of less height than the outer cylinder 42. Connected through the base 38 above referred to with the space between the innermost flared cylinder 36 and the shorter cylinder 41 is a pipe 43 for admitting cold water to the space between the cylinders. A water discharge pipe 44 is connected through the base 38 with the space between the cylinders 41 and 42 and a flue 45 leads from the space formed between the cylinder 42 and the outer-most cylinder 37 for drawing off the products of combustion of the burner 40 by means of a suction fan (not shown).

Figure 2:
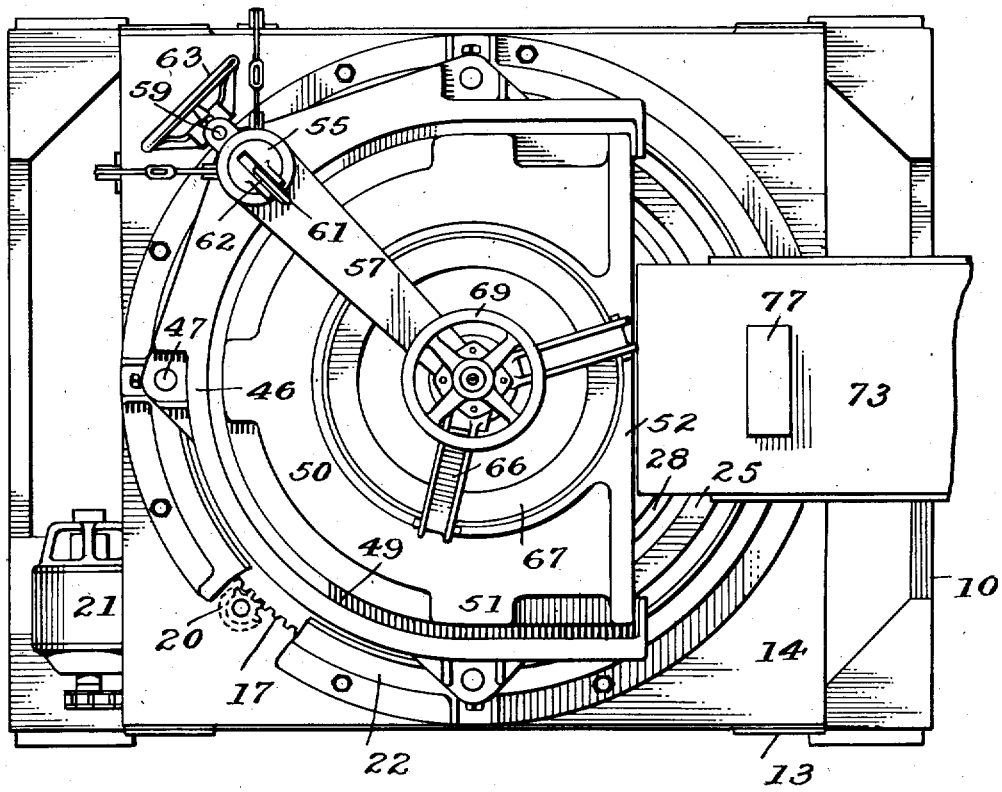
Fig. 2 is a plan view of my apparatus.

A casting 46 is supported above the bowl by means of standards 47 the lower ends of which are inserted in the socket 23 of the housing 22. The casting is provided with an inwardly extending flange 49 supporting a refractory cover 50 which is in part dome-shaped with its lower edge extending over the upper edge of the bowl 28. Outstanding portions of the cover contain ports 51 through which suitable burners (not shown) may be placed, and the sides of the cover extend parallel (Fig. 2) from the transverse center line of the apparatus and terminate in a perpendicular wall 52 which is located in a plane above the bowl 28 approximately midway between its center and edge. This allows a portion of the bowl to remain open at 53 to act as an inlet for the molten glass. The central portion of the cover is formed with an aperture 54 which is concentric with the cone 33.

Fitted in a socket at 56 in the casting and extending upwardly therefrom is a hollow standard 55 (Fig. 1) and vertically slidable on the standard is an arm 57 carrying a perforated lug 58 which is movable on a screw threaded member 59 upon which a nut 60 is adjustable to limit the downward movement of the arm 57. A cable 61 is made fast to the arm 57 and runs over a pulley 62 and down the inside of the hollow standard 55 to a suitable windlass and ratchet means, (not shown) which is operated by a hand wheel 63 (Fig. 2) to raise the arm 57. Formed on the outer end of the arm 57 is a collar 64 to which a sleeve 65 is secured, and a claw piece 66 is clamped to the sleeve 65 for supporting a refractory sleeve 67 by engagement with its flanged upper edge. The sleeve 67, being supported by the arm 57, may be adjusted vertically by raising and lowering the arm and when lowered, by reason of the contact of the walls of the aperture in the lug 58 with the screw threaded member 59, the sleeve will be held in concentric relation to the orifice 33. An externally screw threaded pipe 68 fits movably in the supporting sleeve 65, the threads on the pipe coacting with a threaded hand wheel 69 which is rotatably supported on the top of collar 64. This pipe carries at its lower end, and supplies water to, a cooler 70 which consists preferably of a cone-shaped water jacket. Extending into the jacket and concentric with the pipe 68 is a smaller pipe 71 which acts as an outlet for the water while concentric with this outlet pipe 71 and extending completely through the cooling means is an air-conducting tube 72 whose function will be hereinafter disclosed. The hand wheel 69 enables the cooler 70 to be raised or lowered to vary its distance from the glass flowing into the orifice 33. The water inlet pipe 68 is connected to a suitable water supply and the outlet pipe 71 is connected in any suitable manner with a discharge line for the waste water while the air conducting tube 72 is connected to any suitable air supply.

When the apparatus is to be operated, it is placed with the inlet 53 under the forehearth 73 of a furnace (not shown), the orifice 33 being positioned directly over a hole 74 in the floor upon which the apparatus is supported. Located in the room below is a suitable tractor 75, such as is more fully disclosed in U. S. Patent No. 1,829,429.

In operation the bowl 28 is rotated at a constant rate of speed by the motor 21, and a stream of molten glass 76, regulated by a suitable gate 77 according to the size of the tubing to be drawn, flows into the bowl 28 from the forehearth 73. The glass flows under the edge of the sleeve 67, and as it rises inside of the sleeve, the cooler 70 absorbs some of the heat which is radiated from the exposed surface 78 of the glass 76. The molten glass in the bowl is kept at such a height that its upper surface lies in a plane above the upper end of the cone 32 and hence the glass will flow over the edge of the cone and through the orifice 33 which is large enough in diameter to keep the bore of the tube open, the plastic glass passing downwardly through the cone 32 and the cylinder 36. A steady flow of air is maintained through the tube 72 to create a draft through the bore of the tubing, thereby producing a downward flow of air between the cooler 70 and the surface of the glass at 78 which augments the heat absorbing action of the cooler. This downward draft inside the tubing also tends to cool the inside surface thereof for some distance below the bowl and hastens the hardening of the tubing. When the tubing emerges from the cylinder 36, it is directed through the hole 74 in the floor to the tractor 75 by means of which it is drawn to size. This pulling operation may be accomplished by hand, or at times by gravity, but it has been found that a mechanical apparatus operating at a predetermined rate of speed will produce the best results.

The condition of the glass as it flows over the edge of the orifice 31 may, by varying the relation of the cooler 70 to the surface of the glass, be controlled so that a layer of glass having the correct plasticity for drawing is formed between the cone 32 and the lower edge of the sleeve 67. Since the layer of glass which is uppermost during the drawing operation eventually becomes the inside wall of the tube without contacting with any hard unyielding surface, it is not liable to injury or striation during the drawing operation and consequently the inside of the wall of the tubing will be free from imperfections. By means of the hand wheel 63 and the nut 60 the vertical position of the sleeve 67 may be so adjusted that the height of the glass in relation to the orifice 31 may be maintained and hence sufficient glass will flow over the edge of this orifice to build up the wall of the tube 79 to the desired thickness.

Owing to the initial temperature of the molten glass 76 and the cooling action of the cooler 70, the temperature of the glass flowing over the edge of the orifice 33 increases with its depth or its distance from the cooled upper surface at 78. Therefore, while the layer of glass which forms the inside surface of the tube is sufficiently cooled to support the drawing operation, the glass which contacts the edge of the orifice and forms the outside of the tube may have sufficient fluidity to heal up any striations which may be formed thereon by slight irregularities of the orifice. The flame from the burner 40 is directed so as to heat the orifice and also the surface of the glass as it leaves the orifice, thereby augmenting the initial temperature of the glass sufficiently to cause this healing operation to take place before the tube passes into the cylinder 36, where the cooling action of the water as it flows between the cylinders 36 and 41 causes the tube to be appreciably cooled. This cooling action hastens the hardening of the tube, which is completed by the absorption of the heat from the tube by the air below the bowl. Since the tubing is in a plastic state for a considerable distance below the bowl it may be drawn down to the required size by the tractor 75 before it hardens. The size of the finished product may be controlled by regulating the speed of the tractor or by regulating the viscosity of the glass as it leaves the bowl or both. When the tubing is drawn rapidly, it will be drawn down to a small diameter before solidifying and a slower rate of draw will result in the production of tubing of larger diameter. Further, the viscosity of the glass as it leaves the bowl exercises an influence on the diameter of the tubing as an increased viscosity results in an increase of diameter.

When drawing tubing of large diameter, it may be found necessary to admit air under pressure to the inside of the tube whereupon a large amount of air may be forced through the air conducting tube 72, but in the production of small tubing this is usually unnecessary. By experimentation it will be found that the height of the glass in relation to the orifice 33, the condition of the glass at 78 and the speed of movement of the tractor 75, may be so adjusted in relation to each other as to rapidly produce perfect tubing of the desired dimensions. The bowl 28 may be rotated at a constant rate of speed by the motor 21 to insure uniformity of the temperature and volume of the glass as it flows over the cone 32 and out of the orifice 33. Tubing of very precise dimensions throughout may be produced in this manner, but when less exacting requirements are to be met, I have found that good results may be obtained without rotating the bowl or even by utilizing a stationary container for the molten glass.

While the above disclosure sets out a specific embodiment of my invention, I consider that various changes in structure may be made without violating the spirit of my invention and limit myself only to the scope of the appended claims.

It will be noted that the refractory cone 32 forms an annular curb arising from the bottom of the glass container or bowl 28 and surrounding a downwardly discharging orifice and that the molten glass contained in the latter flows over the crest of such curb into the orifice and in so flowing forms a hollow stream, the inner surface of which is exposed to the cooling radiation of the cooler 70. Thus in the practice of my invention the tube, as distinguished from the molten glass in the container, does not have its interior surface in contact with refractory material or a forming element of any kind but such wall or surface is due entirely to the natural flow of the glass over the crest of the curb. Hence the interior of the tube has a high finish while the exterior of the tube, which has been in contact with the crest of the curb, is refinished by the burner 40.

What I claim is:—

1. In a glass tube making apparatus, a container for molten glass having an outlet orifice for the glass, means for cooling a portion of the glass in the container, and means surrounding the orifice for causing the molten glass which issues through it to assume the form of a hollow stream.

2. In a glass tube drawing apparatus, a container for molten glass having an outlet orifice, an upwardly projecting nipple in said orifice, a depending sleeve concentric with the nipple, cooling means in the sleeve, and means for drawing glass downwardly through the nipple.

3. In a glass tube making apparatus, a covered container for molten glass, a nipple projecting upwardly in the container, a sleeve extending through the cover into the container concentrically with the nipple, means to cause a draft of air from outside the container to flow over the surface of the glass inside the sleeve and cool a portion of the glass, and means to draw the cooled portion downwardly through the nipple.

4. In a tube drawing machine the combination with a container for molten glass having a hollow curb arising from the floor thereof and forming an outlet, of a sleeve, whose lower diameter is substantially larger than the exterior diameter of the curb at its top, projecting into the glass from above, the sleeve being open to atmosphere, a member located in the curb and out of contact with the glass flowing therethrough, and means for introducing air into the interior of the tube formed by the curb below such member.

5. In an apparatus for the manufacture of glass tubing, the combination with a container having a downwardly directed orifice formed by an annular curb in the bottom thereof, a cooled element located within the curb, and means for so regulating the rate of flow over the crest of the curb that the glass moves thereover from the container in an annular stream out of contact with the cooled element.

6. In an apparatus for the manufacture of glass tubing, the combination of a container for molten glass having a downwardly directed orifice formed by an annular curb in the bottom thereof, and a vertically adjustable sleeve concentric with the orifice and projecting into the glass from above and having a greater diameter than the crest of the curb.

7. In an apparatus for the manufacture of glass tubing, the combination of a container having a downwardly directed orifice formed by an annular curb in the bottom thereof, means for rotating the container around the axis of the orifice, and means for so regulating the head of glass over the crest of the curb that the glass moves thereover and downwardly through the orifice in a hollow stream.

8. In an apparatus for the manufacture of glass tubing, the combination of a container having a downwardly directed orifice formed by an annular curb in the bottom thereof, means for rotating the container around the axis of the orifice, means for so regulating the head of glass over the crest of the curb that the glass moves thereover and downwardly through the orifice in a hollow stream, and a heater located below the orifice and acting on the exterior surface of the glass issuing therefrom.

9. In an apparatus for the manufacture of glass tubing, the combination of a container having a downwardly directed orifice formed by an annular curb in the bottom thereof, a cooled element located within the curb, and a vertically adjustable sleeve concentric with the orifice and projecting into the glass from above and having a greater diameter than the crest of the curb, so regulating the rate of flow over the crest of the curb that the glass moves thereover from the container in a hollow stream out of contact with the cooled element.

10. In an apparatus for the manufacture of glass tubing, the combination of a container having a downwardly directed orifice formed by an annular curb in the bottom thereof, a cooled element located within the curb, means for so regulating the rate of flow over the crest of the curb that the glass moves thereover from the container in a hollow stream out of contact with the cooled element, and means for rotating the container around the axis of the orifice.

11. In an apparatus for the manufacture of glass tubing, the combination of a container having a downwardly directed orifice formed by an annular curb in the bottom thereof, a cooled element located within the curb, means for so regulating the rate of flow over the crest of the curb that the glass moves thereover from the container in a hollow stream out of contact with the cooled element, and a heater located below the orifice and acting on the exterior surface of the glass issuing therefrom.

12. In an apparatus for the manufacture of glass tubing, the combination of a container having a downwardly directed orifice formed by an annular curb in the bottom thereof, a vertically adjustable sleeve concentric with the orifice and projecting into the glass from above and having a greater diameter than the crest of the curb, and means for rotating the container around the axis of the orifice.

13. In an apparatus for the manufacture of glass tubing, the combination of a container having a downwardly directed orifice formed by an annular curb in the bottom thereof, a vertically adjustable sleeve concentric with the orifice and projecting into the glass from above and having a greater diameter than the crest of the curb, and a heater located below the orifice and acting on the exterior surface of the glass issuing therefrom.

14. In an apparatus for the manufacture of glass tubing, the combination of a container having a downwardly directed orifice formed by an annular curb in the bottom thereof, a cooled element located within the curb, a vertically adjustable sleeve concentric with the orifice and projecting into the glass from above and having a greater diameter than the crest of the curb, for so regulating the rate of flow over the crest of the curb that the glass moves thereover from the container in a hollow stream out of contact with the cooled element, and means for rotating the container around the axis of the orifice.

15. In an apparatus for the manufacture of glass tubing, the combination of a container having a downwardly directed orifice formed by an annular curb in the bottom thereof, a cooled element located within the curb, a vertically adjustable sleeve concentric with the orifice and projecting into the glass from above and having a greater diameter than the crest of the curb, for so regulating the rate of flow over the crest of the curb that the glass moves thereover from the container in a hollow stream out of contact with the cooled element, and means for introducing air under pressure into the tube below the cooling member.

16. The hereinbefore described method of making glass tubing which comprises flowing glass from a reservoir of molten glass over the crest of an annular curb in a hollow stream, the interior surface of the annular stream being free of contact with a former and chilling such interior surface by radiation.

17. The hereinbefore described method of making glass tubing which comprises flowing glass from a reservoir of molten glass over the crest of an annular curb in a hollow stream, the interior surface of the stream being free of contact with a former and chilling such interior surface by radiation, and by currents of cold air.

18. The hereinbefore described method of making glass tubing which comprises flowing glass from a reservoir of molten glass over the crest of an annular curb, so limiting the rate of flow that the orifice formed by the annular curb is not filled by the flowing glass, and chilling the interior surface of the hollow glass at the curb by radiation from a chilled member located within the curb.

19. The hereinbefore described method of making glass tubing which comprises flowing glass from a reservoir of molten glass over the crest of an annular curb, limiting the rate of flow over such curb so that the orifice is not filled with flowing glass, and controlling the thickness of the tube so formed by determining the rate of flow over the crest of the curb.

20. In a tube making apparatus, a chamber adapted to receive molten glass, said chamber having a peripherally unobstructed overflow orifice formed therein lying in a substantially horizontal plane above the level of the bottom of the chamber, a glass furnace adapted to supply glass to said chamber, a conduit extending between said furnace and said chamber, and means for controlling the rate of flow of glass through said conduit.

21. Apparatus for forming glass tubes comprising a chamber for holding molten glass, said chamber having a peripherally unobstructed circular overflow opening therein above the bottom thereof lying in a horizontal plane, means for supplying glass to said chamber to overflow the edges of said opening, and means for admitting air above said orifices.

22. The method of forming glass tubes which consists in causing molten glass from the upper surface of a bath to flow in a thin sheet over the edge of a circular orifice within the bath having a vertical axis and admitting air above said orifice.

WALTER C. WEBER.